(12) United States Patent
Sterne et al.

(10) Patent No.: US 7,872,973 B2
(45) Date of Patent: Jan. 18, 2011

(54) METHOD AND SYSTEM FOR USING A QUEUING DEVICE AS A LOSSLESS STAGE IN A NETWORK DEVICE IN A COMMUNICATIONS NETWORK

(75) Inventors: Jason Sterne, Ottawa (CA); Robert John Johnson, Ottawa (CA); Aaron Maxwell MacDonald, Ottawa (CA); Richard Grieve, Ottawa (CA); James Michael Schriel, Ottawa (CA)

(73) Assignee: Alcatel Lucent, Paris (FR)

( * ) Notice: Subject to any disclaimer, the term of this patent is extended or adjusted under 35 U.S.C. 154(b) by 677 days.

(21) Appl. No.: 11/377,578

(22) Filed: Mar. 17, 2006

(65) Prior Publication Data

US 2007/0217336 A1 Sep. 20, 2007

(51) Int. Cl.
*H04J 1/16* (2006.01)
*H04L 12/56* (2006.01)

(52) U.S. Cl. ...................... 370/235; 370/412
(58) Field of Classification Search ......... 370/229–236, 370/236.1, 236.2, 400, 401, 412–418, 428, 370/429
See application file for complete search history.

(56) References Cited

U.S. PATENT DOCUMENTS

| | | | | |
|---|---|---|---|---|
| 5,050,066 A | * | 9/1991 | Myers et al. | 714/18 |
| 5,313,454 A | * | 5/1994 | Bustini et al. | 370/231 |
| 5,546,389 A | * | 8/1996 | Wippenbeck et al. | 370/412 |
| 5,995,486 A | * | 11/1999 | Iliadis | 370/229 |
| 6,222,822 B1 | * | 4/2001 | Gerardin et al. | 370/230 |
| 6,314,501 B1 | * | 11/2001 | Gulick et al. | 711/153 |
| 6,452,905 B1 | * | 9/2002 | Smith et al. | 370/236.1 |
| 6,671,255 B1 | * | 12/2003 | Buhrgard et al. | 370/230 |
| 6,674,718 B1 | * | 1/2004 | Heddes et al. | 370/230 |
| 6,678,271 B1 | * | 1/2004 | Flinsbaugh | 370/392 |
| 7,408,876 B1 | * | 8/2008 | Gupta et al. | 370/230 |
| 2002/0163885 A1 | * | 11/2002 | Assa et al. | 370/230.1 |
| 2003/0179720 A1 | * | 9/2003 | Cuny | 370/310 |
| 2004/0095882 A1 | * | 5/2004 | Hamzah et al. | 370/229 |
| 2004/0105388 A1 | * | 6/2004 | Wilkins et al. | 370/235 |
| 2005/0185581 A1 | * | 8/2005 | Bradford et al. | 370/230 |
| 2006/0098672 A1 | * | 5/2006 | Schzukin et al. | 370/412 |
| 2006/0133322 A1 | * | 6/2006 | Vannithamby et al. | 370/335 |
| 2007/0133419 A1 | * | 6/2007 | Segel | 370/236 |

* cited by examiner

*Primary Examiner*—Hong Cho
(74) *Attorney, Agent, or Firm*—Kramer & Amado P.C.

(57) ABSTRACT

A method for incorporating a queuing device as a lossless processing stage in a network device in a communications network, comprising: monitoring a depth of a queue in the queuing device, the queue for receiving packets from an upstream device within the network device, the queuing device acting as a discard point by discarding packets when the queue is full; and, if the depth passes a predetermined threshold, sending a message to the upstream device to reduce a rate at which packets are sent to the queuing device to prevent the queue from filling and thereby preventing packet discarding and loss by the queuing device.

31 Claims, 3 Drawing Sheets

METHOD AND SYSTEM FOR USING A QUEUING DEVICE AS A LOSSLESS STAGE IN A NETWORK DEVICE IN A COMMUNICATIONS NETWORK

FIELD OF THE INVENTION

This invention relates to the field of network devices, and more specifically, to a method and system for incorporating a queuing device (such as a network processor or traffic manager) in a network device in a communications network.

BACKGROUND OF THE INVENTION

In packet-switched networks, a router is a network device or, in some cases, software in a computer, that determines the next network point to which a packet should be forwarded toward its destination. The router is connected to at least two networks and decides which way to send each information packet based on its current understanding of the state of the networks it is connected to. A router is located at any gateway where one network meets another and is often included as part of a network switch.

Typically, a router creates or maintains a table of the available routes and their conditions and uses this information along with distance and cost algorithms to determine the best route for a given packet. Typically, a packet may travel through a number of network points with routers before arriving at its destination. Routing is a function associated with the network layer (Layer 3) in the standard model of network programming, the Open Systems Interconnection ("OSI") reference model.

Thus, a router is an intermediate system which operates at the network layer of the OSI reference model. Routers may be used, for example, to connect two or more Internet Protocol ("IP") networks. In such an application, the router forwards packets from one IP network to another IP network. Such a router consists of a computer with at least two network interface cards supporting the IP protocol. The router receives packets from each interface via a network interface and forwards the received packets to an appropriate output network interface. Received packets have all link layer protocol headers removed, and transmitted packets have a new link protocol header added prior to transmission. The router uses the information held in the network layer header (i.e., the IP header) to decide whether to forward each received packet, and which network interface to use to send the packet. Most packets are forwarded based on the packet's IP destination address, along with routing information held within the router in a routing table. The routing table lists known IP destination addresses with the appropriate network interface to be used to reach that destination. A filter table may also be used to ensure that unwanted packets are discarded. The filter may be used to deny access to particular protocols or to prevent unauthorised access from remote computers by discarding packets to specified destination addresses.

A router introduces delay (i.e., latency) as it processes the packets it receives. The total delay observed is the sum of many components including: time taken to process the packet by the data link protocol; time taken to select the correct output link (i.e., filtering and routing); queuing delay at the output link (i.e., when the link is busy); and, other activities which consume processor resources (e.g., computing routing tables, network management, generation of logging information). The router's queue of packets waiting to be sent also introduces a potential cause of packet loss. Since the router has a finite amount of buffer memory to hold the queue, a router which receives packets at too high a rate may experience a full queue. In this case, the router has no other option than to discard excess packets.

As network speeds and packet processing requirements increase, corresponding improvements are required in router performance. To improve performance, routers may now include queuing devices such as network processors or traffic managers. Network processors, for example, are specialized data processing systems that are optimized to support the implementation of network protocols at the highest possible speed. A network processor typically occupies the space between a network interface and a switch fabric in a router. In such a role, the network processor decides where, when, and how incoming and outgoing data will be sent next. The network processor typically strips, adds, and modifies packet headers. It also makes routing and scheduling decisions. The network processor has interfaces to the network and to the switch fabric.

Early network processors were built around a general purpose processor ("GPP"). The GPP was supported by a direct memory access controller ("DMAC") and simple I/O devices. Traffic was transferred in packets between memory and the switch fabric or network interface. The GPP accessed each packet and programmed the peripheral devices to dispose of it. This architecture changed as network speed outpaced processor and bus speed. The switch fabric interface and network interface were integrated into a single application-specific integrated circuit ("ASIC") to allow packets to be transferred without passing over a system bus. This new architecture meant that control of individual packets was delegated to the ASIC. The ASIC ran hard-wired network protocols. It passed the majority of traffic through, transferring to the GPP only those packets involved in control or signalling, or those that required unusual processing. Today's network processors are designed to replace the fixed-function ASIC, adding software programmability to wire speed processing. In a typical implementation in a router, a modern network processor operates as a stage in the data plane and is controlled by a processor (e.g., a GPP) in the router operating in the control plane.

Thus, network processors manipulate packets at wire speed to implement a variety of functions including quality of service ("QoS"), encryption, firewalling, and such. These functions are often specified as network protocols, so they are implemented in protocol stacks. But network processors do not run entire protocol stacks. Protocol stacks are designed to run on GPPs and GPPs are designed—among other things—to run protocol stacks. The role of the network processor is to implement only those parts of a protocol that require direct access to the data stream. Complex behaviour is left to the GPP. The network processor's workload boils down to logically simple functionality, such as detecting packets that match specified patterns, counting packets, and enqueuing packets.

However, even with the improved performance of routers through the addition of network processors and traffic managers, router performance issues continue to exist.

A need therefore exists for an improved method and system for incorporating queuing devices such as network processors and traffic managers in network devices such as routers, switches, and gateways. Accordingly, a solution that addresses, at least in part, the above and other shortcomings is desired.

SUMMARY OF THE INVENTION

According to one aspect of the invention, there is provided a method for incorporating a queuing device as a lossless processing stage in a network device in a communications network, comprising: monitoring a depth of a queue in the queuing device, the queue for receiving packets from an upstream device within the network device, the queuing device acting as a discard point by discarding packets when the queue is full; and, if the depth passes a predetermined threshold, sending a message to the upstream device to reduce a rate at which packets are sent to the queuing device to prevent the queue from filling and thereby preventing packet discarding and loss by the queuing device.

The method may further include, if the depth drops below the predetermined threshold, sending a message to the upstream device to increase the rate at which packets are sent to the queuing device. The method may further include sending a message reporting the depth of the queue to the upstream device to thereby enable the upstream device to determine whether to reduce or increase the rate at which it sends packets to the queuing device. The monitoring may further include comparing a rate at which packets enter the queuing device to a rate at which packets exit the queuing device. The network device may be a router, switch, or gateway. The upstream device may be another queuing device. The queuing device may be a network processor or traffic manager. And, the packets may be at least one of Internet Protocol ("IP") packets, multiprotocol label switching ("MPLS") packets, asynchronous transfer mode ("ATM") packets, and frame relay packets.

In accordance with further aspects of the present invention there is provided an apparatus such as a data processing system (e.g., network processor, traffic manager, general purpose processor, network management system, etc.), a method for adapting this system, as well as articles of manufacture such as a computer readable medium having program instructions recorded thereon for practising the method of the invention.

BRIEF DESCRIPTION OF THE DRAWINGS

Features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

In the following description, details are set forth to provide an understanding of the invention. In some instances, certain software, circuits, structures and techniques have not been described or shown in detail in order not to obscure the invention. The term "data processing system" is used herein to refer to any machine for processing data, including the network processors, traffic managers, general purpose processors, network management systems, routers, switches, and other network devices described herein. The present invention may be implemented in any computer programming language provided that the operating system of the data processing system provides the facilities that may support the requirements of the present invention. Any limitations presented would be a result of a particular type of operating system or computer programming language and would not be a limitation of the present invention.

Figure 1:
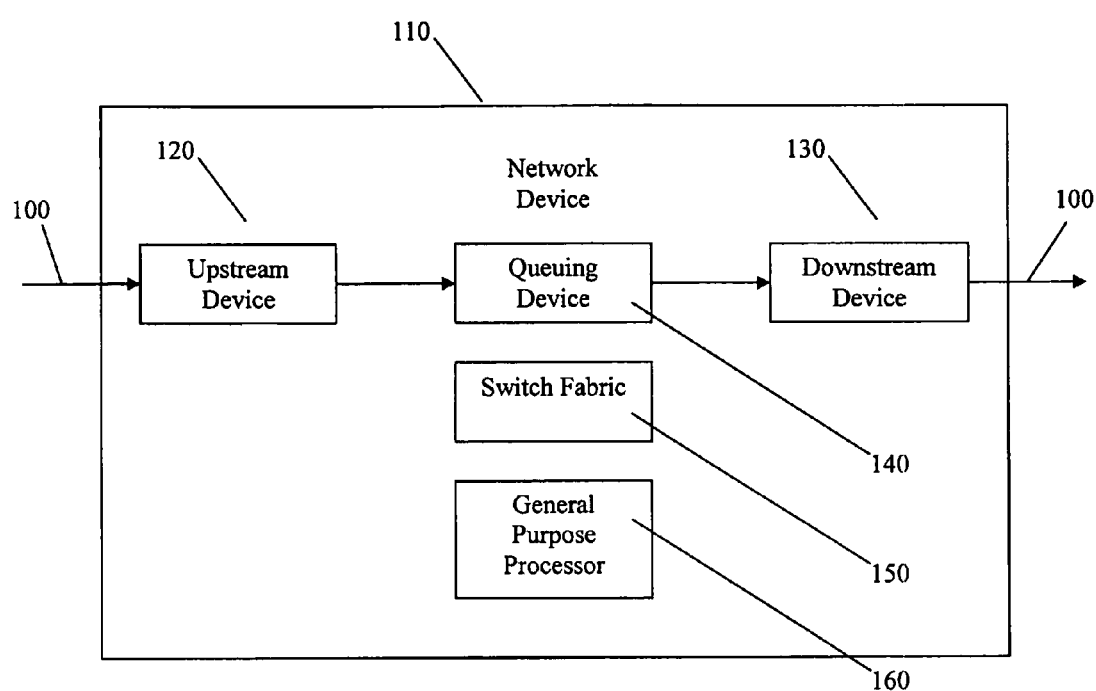
FIG. 1 is a block diagram illustrating a network device in a communications network in accordance with an embodiment of the invention.

FIG. 1 is a block diagram illustrating a network device 110 in a communications network 100 in accordance with an embodiment of the invention. The communications network 100 couples the network device 110, for example, to end customer systems or networks (not shown). The network device 110 may be a router, switch, home gateway, or any other device that receives and transmits data. The network device 110 may be coupled to a network management system ("NMS") (not shown) for configuration, control, etc. The network device 110 includes at least one queuing device (e.g., a network processor or traffic manager) 140 coupled to one or more upstream devices 120 and downstream devices 130 within the network device 110. The upstream devices 120 may be queuing devices or traffic managers. The downstream devices 130 may be queuing devices or framer devices. One or more of the queuing, upstream, and downstream devices 120, 130, 140 may be coupled to a switch fabric 150, which performs switching functions, and to a general purpose processor ("GPP") 160, which controls the overall operation of the network device 110.

Figure 2:
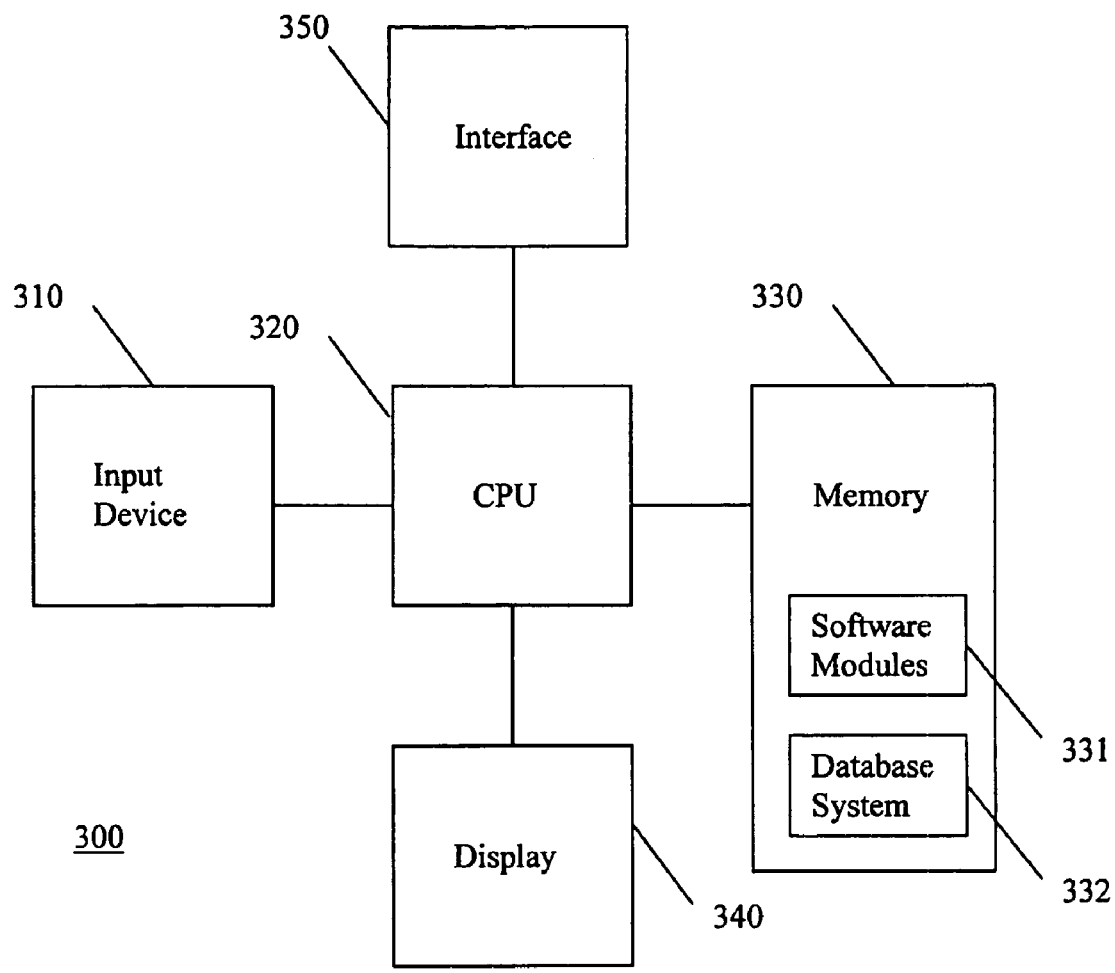
FIG. 2 is a block diagram illustrating a data processing system adapted to implement an embodiment of the invention; and, FIG. 3 is a flow chart illustrating operations of software modules within the memory of a data processing system for incorporating a queuing device as a lossless processing stage in a network device in a communications network, in accordance with an embodiment of the invention.

FIG. 2 is a block diagram illustrating a data processing system 300 adapted to implement an embodiment of the invention. The data processing system 300 is suitable for operation as a general purpose processor 160, a queuing device 140, a NMS, or as a network device 110. The data processing system 300 includes a central processing unit ("CPU") 320, memory 330, and an interface device 350 and may optionally include an input device 310 and a display 340. The CPU 320 may include dedicated coprocessors and memory devices. The memory 330 may include RAM, ROM, disk devices, and databases. The interface device 350 may include a network connection and/or bus connection. The input device 310 may include a keyboard, a mouse, a trackball, or a similar device. And, the display 340 may include a computer screen, terminal device, or a hardcopy producing output device such as a printer or plotter. The data processing system 300 is adapted for communicating with other data processing systems (e.g., 110, 120, 130, 140) over a network 100 or bus via the interface device 350. The data processing system 300 may include a database system 332 for storing and accessing network topology and programming information. The database system 332 may include a database management system ("DBMS") and a database and is stored in the memory 330 of the data processing system 300. The data processing system 300 has stored therein data representing sequences of instructions which when executed cause the method described herein to be performed. Of course, the data processing system 300 may contain additional software and hardware a description of which is not necessary for understanding the invention.

Thus, the data processing system 300 includes computer executable programmed instructions for directing the system 300 to implement the embodiments of the present invention. The programmed instructions may be embodied in one or more software modules 331 resident in the memory 330 of the data processing system 300. Alternatively, the programmed instructions may be embodied on a computer readable medium (such as a CD disk or floppy disk) which may be used for transporting the programmed instructions to the memory 330 of the data processing system 300. Alternatively, the programmed instructions may be embedded in a computer-readable, signal or signal-bearing medium that is uploaded to a network by a vendor or supplier of the programmed instructions, and this signal or signal-bearing medium may be downloaded through an interface (e.g., 350) to the data processing system 300 from the network by end users or potential buyers.

The queuing device 140 of the network device 110 includes one or more queues stored in its memory 330 for receiving, storing, and forwarding packets received from the upstream devices 120. The queues may be first-in first-out ("FIFO") queues.

Now, the present invention provides for the more effective use of queuing devices 140 in network devices 110. Typically, the queuing device 140 is provided by a queuing device manufacturer and is integrated into the network device 110 by the manufacturer of the network device 110. While the queuing device 140 may perform a number of useful functions (e.g., Layer 2 ("L2") processing, Layer 3 ("L3") processing, buffering, queuing, scheduling, etc.), such devices are often designed to assume a certain function in the system in which they are installed (e.g., 110) that may not correspond to the exact function that the manufacturer of the network device 110 may want it to perform. This can be problematic. Often, for example, the queuing device 140 is a discard point for packets as the queuing device 140 is designed to assume the function of the main queuing/buffering point in the system in which it is installed. As such, when a queue in the memory 330 of the queuing device 140 is filled, the queuing device 140 will typically begin discarding packets from the queue in accordance with a predetermined scheme (e.g., tail-drop, weighted random early detection ("WRED"), etc.). On the other hand, the network device manufacturer may wish to take advantage of the processing capabilities (e.g., L2/L3 capabilities) of the queuing device 140 without actually using it as a discard point. What is required then is to have the queuing device 140 behave in a lossless manner (i.e., with respect to packets). However, such functioning is typically not supported by the queuing device 140. Accordingly, such a queuing device 140 may simply not be included in the design of a higher functioning network device 110. The queuing device's function may be replaced by a field programmable gate array ("FPGA") customized by the network device manufacturer or the network device manufacturer may use another device which may be more expensive yet less featured. This increases the network device manufacturer's overall costs. Advantageously, the present invention allows such a queuing device 140 to function in a lossless manner within a network device 110.

According to one embodiment of the invention, a method is provided for using a buffering and discarding device, such a queuing device 140, as a lossless processing stage in a network device 110. This is accomplished by providing a queue depth monitoring system that detects when the queues in the queuing device 140 are getting too deep. Instead of allowing the queuing device 140 to fill its queues and discard traffic packets, the queue depth monitoring system alerts an upstream device (e.g., 120 in FIG. 1) to slow down or stop sending traffic destined to the congested queue or queues in the queuing device 140. Once the queue has been drained, the queue depth monitoring system can then alert the upstream device 120 to begin sending traffic to the queue again.

The queue depth monitoring system may be an external device (e.g., an FPGA, a data processing system 300, etc.) installed in the network device 110 that examines traffic at the input and output of the queuing device 140. Alternatively, the queue depth monitoring system may be implemented by one or more software modules 331 running on either the queuing device 140 or the general purpose processor 160.

According to one embodiment, the queue depth monitoring system provides for error recovery in the event that it makes a mistake or that a message is lost or corrupted. The queue depth monitoring system provides for error recovery by periodically reporting queue depths rather than only reporting threshold crossing events.

According to one embodiment, the upstream device 120 may have a number of queues from which packets are sent to the queuing device 140. In this case, the queue depth monitoring system may provide the upstream device 120 with messages directed to each of its queues with respect to controlling the rate at which packets are sent to the queuing device 140.

According to one embodiment, the upstream device 120 may respond to a message from the queuing device 140 (i.e., with respect to controlling the rate at which packets are sent to the queuing device 140) with a message instructing the queuing device 120 to begin discarding messages. This response message may include a rate at which the queuing device 140 should discard packets. The rate at which the queuing device 140 should discard packets may be coordinated with a rate at which the upstream device 120 sends packets to the queuing device 140.

According to one embodiment, the upstream device 120 may forward or relay a message from the queuing device 140 (i.e., with respect to controlling the rate at which packets are sent to the queuing device 140) to an upstream network device (not shown but similar to network device 110) in the network 100 to thereby control the rate at which the upstream device 120 receives packets from the upstream network device.

According to one embodiment, the queuing device 140 is an integrated queuing and packet processing device 140 and the upstream device 120 performs the majority of the traffic management functions within the network device 110. In particular, the upstream device 120 may have a number of queues for receiving packets having different priorities. The upstream device 120 performs priority arbitration with respect to the packets it receives to produce an output stream of packets (including packets having different priorities) or data that is sent to the integrated device 140. The integrated device 140 performs packet processing on the packets or data it receives to produce an output packet or data stream. The packet processing performed by the integrated device 140 may include processing that divides packets or otherwise introduces information to packets such that the rate at which data exits the integrated device 140 differs from the rate at which data is received by the integrated device 140 from the upstream device 120. The rate at which data exits the integrated device 140 may be a fixed bit or byte rate. Note that a packet rate differs from a data rate in that a packet may include a variable number of bytes (e.g., from 2 bytes to 10,000 bytes).

The present invention provides several advantages. It allows network device manufacturers to use third party queuing devices in their network devices that otherwise could not be used. This allows network device manufacturers to take advantage of low cost and fully featured queuing devices to improve the overall performance of their network devices.

Figure 3:
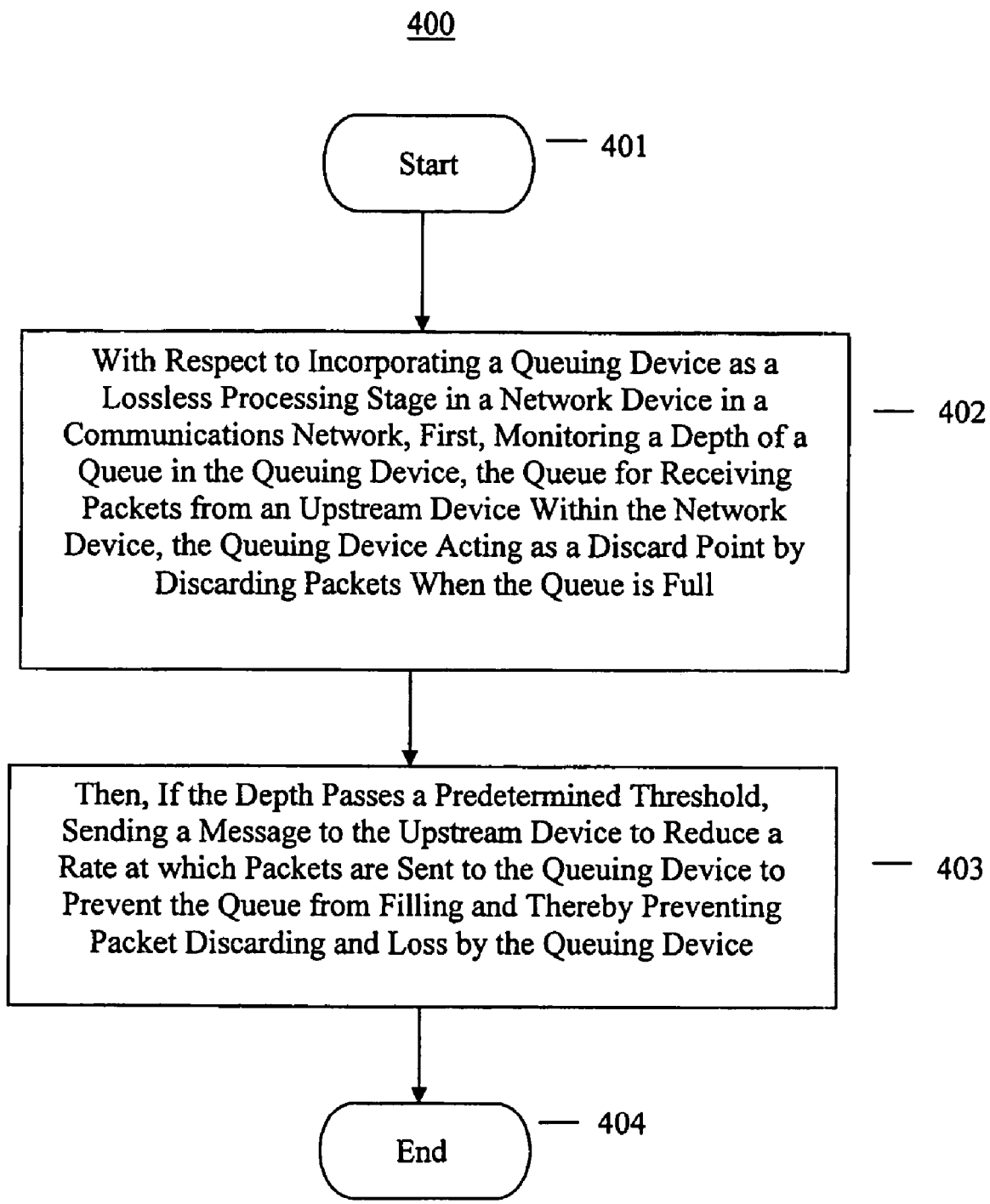

The above described method may be summarized with the aid of a flowchart. FIG. 3 is a flow chart illustrating operations 400 of software modules 331 within the memory 330 of a data processing system 300 for incorporating a queuing device 140 as a lossless processing stage in a network device 110 in a communications network 100, in accordance with an embodiment of the invention.

At step 401, the operations 400 start.

At step 402, a depth of a queue in the queuing device 140 is monitored, the queue for receiving packets from an upstream device (e.g., 120) within the network device 110, the queuing device 140 acting as a discard point by discarding packets when the queue is full.

At step 403, if the depth passes a predetermined threshold, a message is sent to the upstream device 120 to reduce a rate at which packets are sent to the queuing device 140 to prevent the queue from filling thereby preventing packet discarding and loss by the queuing device 140.

At step 404, the operations 400 end.

The method may further include, if the depth drops below the predetermined threshold, sending a message to the upstream device 120 to increase the rate at which packets are sent to the queuing device 140. The method may further include sending a message reporting the depth of the queue to the upstream device 120 to thereby enable the upstream device 120 to determine whether to reduce or increase the rate at which it sends packets to the queuing device 140. The monitoring may further include comparing a rate at which packets enter the queuing device 140 to a rate at which packets exit the queuing device 140. The network device 110 may be a router, switch, or gateway. The upstream device 110 may be another queuing device. The queuing device 140 may be a network processor or traffic manager. And, the packets may be at least one of Internet Protocol ("IP") packets, multiprotocol label switching ("MPLS") packets, asynchronous transfer mode ("ATM") packets, and frame relay packets.

While this invention is primarily discussed as a method, a person of ordinary skill in the art will understand that the apparatus discussed above with reference to a data processing system 300, may be programmed to enable the practice of the method of the invention. Moreover, an article of manufacture for use with a data processing system 300, such as a prerecorded storage device or other similar computer readable medium including program instructions recorded thereon, may direct the data processing system 300 to facilitate the practice of the method of the invention. It is understood that such apparatus and articles of manufacture also come within the scope of the invention.

In particular, the sequences of instructions which when executed cause the method described herein to be performed by the data processing system 300 of FIG. 2 can be contained in a data carrier product according to one embodiment of the invention. This data carrier product can be loaded into and run by the data processing system 300 of FIG. 2. In addition, the sequences of instructions which when executed cause the method described herein to be performed by the data processing system 300 of FIG. 2 can be contained in a computer software product according to one embodiment of the invention. This computer software product can be loaded into and run by the data processing system 300 of FIG. 2. Moreover, the sequences of instructions which when executed cause the method described herein to be performed by the data processing system 300 of FIG. 2 can be contained in an integrated circuit product including a coprocessor or memory according to one embodiment of the invention. This integrated circuit product can be installed in the data processing system 300 of FIG. 2.

The embodiments of the invention described above are intended to be exemplary only. Those skilled in this art will understand that various modifications of detail may be made to these embodiments, all of which come within the scope of the invention.

What is claimed is:

1. A method for incorporating a queuing device as a lossless processing stage in a network device in a communications network between an upstream device and a downstream device in the network device, comprising:

monitoring a depth of a queue in the queuing device, wherein the queue receives packets from the upstream device within the network device, and the queuing device acts as a discard point by discarding packets when the queue is full, wherein the upstream device is a traffic manager;

if the depth of the queue passes a predetermined threshold, sending a message to the upstream device to reduce a rate at which packets are sent to the queuing device to prevent the queue from filling, thereby preventing packet discarding and loss by the queuing device;

sending a message reporting the depth of the queue to the upstream device to thereby enable the upstream device to determine whether to reduce or increase the rate at which the upstream device sends packets to the queuing device; and sending the message from the upstream device to an upstream network device to thereby control a rate at which the upstream device receives packets from the upstream network device.

2. The method of claim 1, further comprising, if the depth drops below the predetermined threshold:

sending a message to the upstream device to increase the rate at which packets are sent to the queuing device.

3. The method of claim 1, wherein the monitoring further comprises:

comparing a rate at which packets enter the queuing device to a rate at which packets exit the queuing device.

4. The method of claim 1, wherein the network device is a router, switch, or gateway.

5. The method of claim 1, wherein the queuing device is a network processor or traffic manager.

6. The method of claim 1, wherein the packets are at least one of Internet Protocol ("IP") packets, multiprotocol label switching ("MPLS") packets, asynchronous transfer mode ("ATM") packets, and frame relay packets.

7. The method of claim 1, further comprising, after the queue has been drained:

alerting the upstream device to resume sending traffic to the queue.

8. The method of claim 1, further comprising:

periodically reporting the depth of the queue to provide for error recovery.

9. A system for incorporating a queuing device as a lossless processing stage in a network device in a communications network between an upstream device and a downstream device in the network device, the system comprising:

a processor coupled to the queuing device;

and, modules executed by the processor, the modules including:

a module for monitoring a depth of a queue in the queuing device, wherein the queue receives packets from the upstream device within the network device and the queuing device acts as a discard point by discarding packets when the queue is full, wherein the upstream device is a traffic manager;

a module for, if the depth of the queue passes a predetermined threshold, sending a message to the upstream device to reduce a rate at which packets are sent to the queuing device to prevent the queue from filling, thereby preventing packet discarding and loss by the queuing device;

a module for sending a message reporting the depth of the queue to the upstream device to thereby enable the upstream device to determine whether to reduce or increase the rate at which the upstream device sends packets to the queuing device; and a module for sending the message from the e stream device to an upstream network device to thereby control a rate at which the upstream device receives packets from the upstream network device.

10. The system of claim 9, further comprising:
a module for, if the depth drops below the predetermined threshold, sending a message to the upstream device to increase the rate at which packets are sent to the queuing device.

11. The system of claim 9, wherein the module for monitoring further comprises:
a module for comparing a rate at which packets enter the queuing device to a rate at which packets exit the queuing device.

12. The system of claim 9, wherein the network device is a router, switch, or gateway.

13. The system of claim 9, wherein the queuing device is a network processor or traffic manager.

14. The system of claim 9, wherein the packets are at least one of Internet Protocol ("IP") packets, multiprotocol label switching ("MPLS") packets, asynchronous transfer mode ("ATM") packets, and frame relay packets.

15. The system of claim 9, wherein the system is implemented within the queuing device.

16. The system of claim 9, wherein the system is implemented within a general purpose processor within the network device.

17. The system of claim 9, wherein the system is implemented with a field programmable gate array ("FPGA") within the network device.

18. The system of claim 9, wherein the system is implemented within a network management system ("NMS") coupled to the network device over the network.

19. A method for incorporating an integrated queuing and packet processing device as a lossless processing stage in a network device in a communications network between an upstream device and a downstream device in the network device, the method comprising:
monitoring a depth of a queue in the integrated device, wherein the queue receives packets from the upstream device within the network device, the packets from the upstream device include packets having different priorities arbitrated by the upstream device, and the integrated device acts as a discard point by discarding packets when the queue is full, wherein the upstream device is a traffic manager;
if the depth of the queue passes a predetermined threshold, sending a message to the upstream device to reduce a rate at which packets are sent to the integrated device to prevent the queue from filling and thereby preventing packet discarding and loss by the integrated device, wherein a rate at which data is sent to the integrated device differs from a rate at which data is sent from the integrated device due to packet processing within the integrated device;
sending a message reporting the depth of the queue to the upstream device to thereby enable the upstream device to determine whether to reduce or increase the rate at which the upstream device sends packets to the integrated device; and
sending the message from the upstream device to an upstream network device to thereby control a rate at which the upstream device receives packets from the upstream network device.

20. The method of claim 19, further comprising, if the depth drops below the predetermined threshold:
sending a message to the upstream device to increase the rate at which packets are sent to the integrated device.

21. The method of claim 19, wherein the monitoring further comprises comparing the rate at which data is sent to the integrated device to the rate at which data is sent from the integrated device.

22. The method of claim 19, wherein the network device is a router, switch, or gateway.

23. The method of claim 19, wherein the upstream device is another integrated device.

24. The method of claim 19, wherein the integrated device is a network processor or traffic manager.

25. The method of claim 19, wherein the packets are at least one of Internet Protocol ("IP") packets, multiprotocol label switching ("MPLS") packets, asynchronous transfer mode ("ATM") packets, and frame relay packets.

26. A queuing device for incorporation as a lossless processing stage in a network device in a communications network between an upstream device and a downstream device in the network device, the queuing device comprising:
a processor coupled to a queue, wherein the queue receives packets from the upstream device within the network device;
and, modules executed by the processor, the modules including:
a module for monitoring a depth of the queue, the queuing device acting as a discard point by discarding packets when the queue is full;
a module for, if the depth of the queue passes a predetermined threshold, sending a message to the upstream device to reduce a rate at which packets are sent to the queuing device to prevent the queue from filling and thereby preventing packet discarding and loss by the queuing device, wherein the upstream device is a traffic manager;
a module for sending a message reporting the depth of the queue to the upstream device to thereby enable the upstream device to determine whether to reduce or increase the rate at which the upstream device sends packets to the queuing device; and
a module for sending the message from the upstream device to an upstream network device to thereby control a rate at which the upstream device receives packets from the upstream network device.

27. The queuing device of claim 26, further comprising:
a module for, if the depth drops below the predetermined threshold, sending a message to the upstream device to increase the rate at which packets are sent to the queuing device.

28. The queuing device of claim 26, wherein the module for monitoring further comprises a module for comparing a rate at which packets enter the queuing device to a rate at which packets exit the queuing device.

29. The queuing device of claim 26, wherein the network device is a router, switch, or gateway.

30. The queuing device of claim 26, wherein the queuing device is a network processor or traffic manager.

31. The queuing device of claim 26, wherein the packets are at least one of Internet Protocol ("IP") packets, multiprotocol label switching ("MPLS") packets, asynchronous transfer mode ("ATM") packets, and frame relay packets.

* * * * *